United States Patent [19]

Bauer et al.

[11] Patent Number: 4,697,947
[45] Date of Patent: Oct. 6, 1987

[54] PLUG CONNECTION FOR BORING TUBES

[75] Inventors: Karlheinz Bauer; Johann Haberer, both of Schrobenhausen; Maximilian M. Arzberger, Igenhausen, all of Fed. Rep. of Germany

[73] Assignee: Karl Bauer Spezialtiefbau GmbH & Co. KG, Schrobenhausen, Fed. Rep. of Germany

[21] Appl. No.: 868,006

[22] Filed: May 29, 1986

[30] Foreign Application Priority Data

Jun. 3, 1985 [DE] Fed. Rep. of Germany ....... 3519773

[51] Int. Cl.$^4$ ............................ B25G 3/00; F16D 1/00
[52] U.S. Cl. ....................................... 403/14; 403/318; 403/326; 285/305
[58] Field of Search ................. 403/326, 318, 319, 14; 411/352, 353, 517, 518, 519, 337, 530; 285/305

[56] References Cited

U.S. PATENT DOCUMENTS

| 3,239,244 | 3/1966 | Leinfelt | 285/305 X |
| 3,910,566 | 10/1975 | Pedersen et al. | 411/517 X |
| 4,293,148 | 10/1981 | Milberger | 285/305 X |
| 4,498,874 | 2/1985 | Pichl | 285/305 X |

FOREIGN PATENT DOCUMENTS

| 2357260 | 5/1975 | Fed. Rep. of Germany | 285/305 |
| 2719193 | 11/1977 | Fed. Rep. of Germany | 403/326 |
| 1310712 | 10/1962 | France | 285/305 |
| 570755 | 8/1977 | U.S.S.R. | 285/305 |

Primary Examiner—Andrew V. Kundrat
Attorney, Agent, or Firm—Fleit, Jacobson, Cohn & Price

[57] ABSTRACT

In the case of a plug connection for drilling or boring tubes, rods and worms for earth boring equipment with a male part and a female part, with a radial coupling for torque transfer and with an axial coupling having in the overlap zone of the male and female parts a locking device which can be introduced into an annulus for transferring axial forces, it is provided that the locking device is constructed as a multilink chain, which essentially extends around the entire annulus and which is introduced through the female part into the annulus via a single opening. This device provides a plug connection, which has a very simple construction and after extremely rapid installation is suitable for transferring very high forces.

7 Claims, 6 Drawing Figures

PLUG CONNECTION FOR BORING TUBES

BACKGROUND OF THE INVENTION

The present invention relates to a plug connection for drilling or boring tubes, pipes and worms of earth boring equipment or the like in accordance with the preamble of claim 1.

A known plug connection for boring tubes is provided at one tube end with a male part and at the opposite tube end with a female part. One half of a radial and an axial coupling is in each case constructed on the male and female part. The radial coupling half on the male part is positioned at a point which is set back with respect to its front end and comprises uniformly external circumferentially distributed wedges or keys and the half of the axial coupling on the male part comprises an external circumferentially fitted annular slot with tapped holes in the slot bottom arranged on a front portion with respect to the radial coupling. On its front end portion, the female part is directly provided with recesses passing through the entire female part wall and these are shaped in complementary manner to the wedges formed on the male part. The radial coupling for transferring the torque is formed by a V or claw coupling. At a set back point on the inner circumference of the female part is provided an annular slot, which in the coupled state comes to rest directly over the allround slot formed in the male part, so that the two recesses form a circumferentially extending annulus or annular space. The annular slot in the femal part is accessible from the outside via several, e.g. three openings, which essentially have the same axial extension as the annular slot and which directly issue into the latter. At the said openings, it is possible to pass through the complete wall thickness of the female part. For the positive coupling of male and female parts, a locking device is necessary and comprises several units, which have to be individually fitted through the openings into an annulus portion. Such a locking unit comprises two wedges or keys, which are inserted in the opposite circumferential direction through the opening into the annulus. The two wedges must then be prevented from falling out by an additional securing means, e.g. a spring clip and a screw. The screw must be turned into tapped holes formed in the annular slot on the male part.

It is a disadvantage of the known procedure for forming a positive axial coupling between the male and female parts that the locking device comprises several locking units, whereof each is constituted by several loose parts and whereof each must be separately fitted and dismantled. It is also disadvantageous in the known coupling device that each locking unit must be brought into coupling engagement through a separate opening. Thus, several openings or windows uniformly distributed over the circumference of the female part are required, so that the cross-section for femal part force transfer is considerably weakened.

It is also disadvantageous that in the case of the known locking units, it is necessary in each case to provide a securing means, which prevents the inserted parts or mating parts from falling out.

SUMMARY OF THE INVENTION

The problem of the present invention is to provide a plug connection of the aforementioned type, which is able to transfer very high forces, whilst having a very simple construction and which can be fitted extremely rapidly.

This problem is solved by the characterizing features of claim 1.

According to the basic concept of the invention the locking device for the axial coupling of the male and female parts is constructed as a multilink chain extending around the entire annulus and which can be introduced through the female part into the annulus by means of a single opening.

Thus, a locking device comprising dimensionally stable elements is proposed, which can be used for the re-equipping of known plug connections and which can be installed on new plug connections suitable for higher force transfers. The multilink chain according to the invention replaces the known locking units. The construction of the locking device is greatly simplified and through a simple insertion of the multilink chain through a single opening in the circumferential direction a very rapid assembly is possible, even without using tools. In addition, the axial pressure is distributed over the entire circumference, because almost the entire annulus is filled by the positive-connecting elements. The plane of shear for transferring the axial force becomes extremely large. The fact that the inventive locking device only constitutes a single connecting member leads to the important advantages that a loss of small parts is prevented and that the multilink chain need no longer be secured from dropping out of the annulus in the fitted state, particularly if the chain links are interconnected by a spring steel strip.

As a result of the novel locking device, it is also no longer necessary to incorporate several openings into the female part and it is sufficient for the latter to contain a single opening, through which the inventive chain can be tangentially inserted. This not only reduces the manufacturing costs for the female part, but simultaneously the advantage is obtained that due to the reduced weakening of the female part, it is suitable for higher force transfer than hitherto in the case of the same dimensions.

According to a preferred embodiment, the multilink chain is formed by a plurality of interconnected, spaced, parallepipedic steel blocks. This chain construction is particularly suitable for re-equipping known plug connections, because the latter generally have an annulus with a square cross-section.

In the case of new plug connections, it may be appropriate to construct the annulus between the male and female parts with a circular cross-section and in this case the chain links are constructed as a plurality of spaced steel rollers.

The use of the aforementioned inventive chains is particularly appropriate if they are interconnected by a spring steel strip, it being unnecessary to provide additional means to prevent the chain from dropping out of the annulus.

Most of the advantages linked with the invention are still achieved if the chain links are interconnected by at least one steel cable, on which they are arranged in sequence and in particular kept spaced by soldering spots. The basic principle of the invention is also realized with this embodiment.

A further advantageous embodiment of the invention is constituted by a multilink chain, which is formed by a plurality of immediately adjacent, solid chain links, in which in each case two adjacent chain links can be pivoted about a common axis which, in the fitted state, is coaxial to the plug connection axis. With this type of invention locking device, it is possible to axially transfer an extremely high force, because the packing of the chain links is extremely dense.

In order to simplify the maximum possible extent the fitting of the link chain according to the invention, in the case of a female part adapted to the invention and having only a single opening, the latter is chamfered at least on the side defining the opening in the circumferential direction and past which the chain is moved on insertion into the annulus, that the multilink chain can be easily inserted into the female part. Such a chamfer can e.g. be produced by spark erosion. Such a process also makes it possible to chamfer the second opening side, defining the opening in the circumferential direction.

For transferring a higher torque, it is possible to provide the coupling half of the radial coupling of the female part, produced anew with the inventive link chain, with axially spaced pockets on the inner circumference of the front end portion of the female part overlapping the male part and said pockets are complementary to the wedges formed on the male part. In this embodiment, the wall thickness of the female part is not completely perforated, so that the cross-section for transferring the torque is weakened as little as possible.

Particularly if the inventive device is to be used for drilling tubes in whose internal cross-section flows a liquid, it is advantageous to axially incorporate an annular slot into the outer circumference of the front end portion of the male part upstream of the recess for the annulus and in it is arranged a packing. A packing fitted in this way protects both the axial and radial couplings from damage caused by penetrating water.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
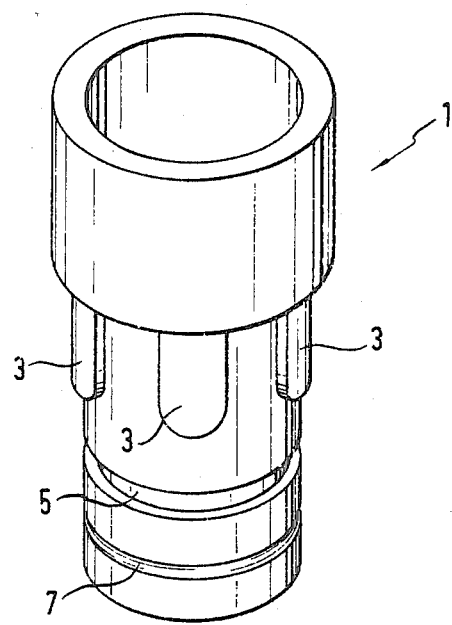
FIG. 1 A perspective view of the male part of a plug connection.

According to FIG. 1, the male part 1 of a plug connection has one half of a radial coupling, comprising wedges or keys 3, an annular recess 5 as the inner half of an annulus to be formed and an annular slot 7, into which is to be fitted a packing. The annular slot 7 is located on the front portion of the male part 1 and is followed by the annular recess 5. The wedges 3 of the radial coupling are set back as far as possible.

Figure 2:
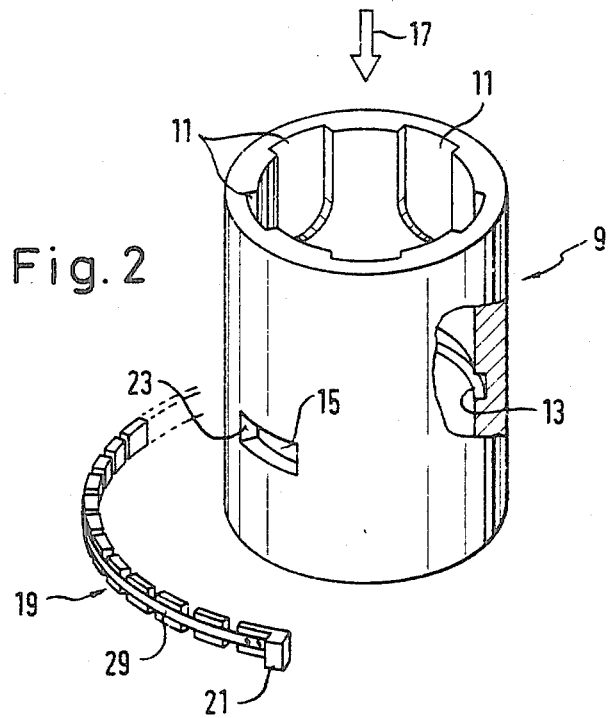
FIG. 2 A perspective view of the female part of a plug connection with a link chain.

FIG. 2 shows the female part 9 of the plug connection. Several pockets 11 are circumferentially spaced along the inner circumference of the front end portion of female part 9 and these have a complementary contour to the wedges 3 of male part 1. The wall thickness of the female part 9 is not perforated by pockets 11. An annular recess 13 is set back on the inner circumference of female part 9 with respect to the pockets 11 forming the second half of the radial coupling. On the same axial side as that on which the annular recess 13 is formed in female part 9, there is an opening 15 essentially having the same axial extension as the annular recess 13 and which issues directly into the latter.

In order to produce the plug connection male part 1 is moved into female part 9 in the direction of arrow 17. In the fitted state, the annular recesses 5, 13 are directly superimposed, so that they jointly define an annulus, which in the represented case has a rectangular cross-section. Chain 19 can be inserted tangentially into the annulus through opening 15. The last link of chain 19 can, as shown in FIG. 2, be constructed with a nose 21, in order to facilitate the insertion and/or removal of the chain.

If this appears appropriate in the particular application and in accordance with the nature of the chain used, opening 15 can contain a means for preventing the automatic moving out of the chain.

To facilitate the insertion of chain 19 into female part 9, e.g. the side 23 circumferentially defining opening 15 can be chamfered in such a way that the chain 19 can be easily tangentially inserted into recesses 5, 13. The outside or inside of side 25, facing side 23 can also be chamfered.

FIGS. 3a to 3d show several embodiments of the link chain 19.

Figure 3:
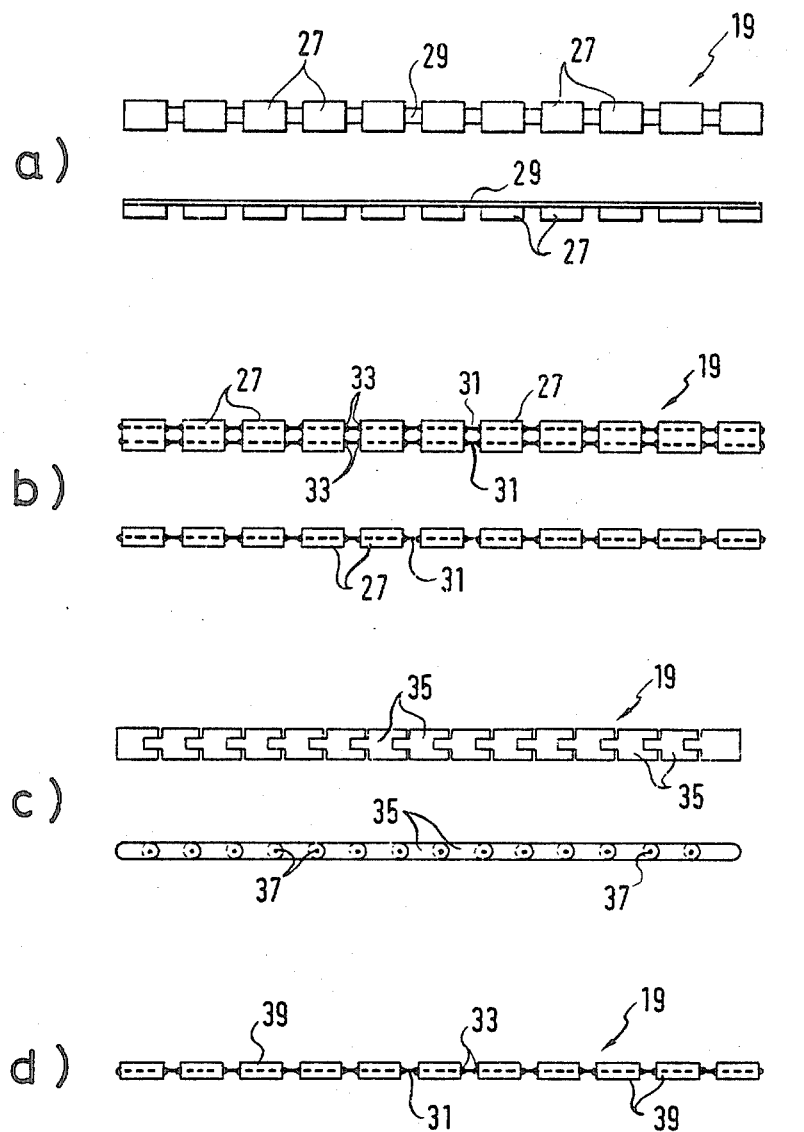
FIGS. 3a to c Different embodiments of link chains in front and plan view.
FIG. 3d Another embodiment of a link chain in plan view.

The embodiment of FIG. 3a essentially corresponds to chain 19 in FIG. 2. The individual chain links are formed by a plurality of parallepipedic steel blocks 27, which are arranged in spaced manner and interconnected by a spring steel strip 29.

In the case of the chain 19 according to FIG. 3b, the chain links are again constituted by parallepipedic steel blocks 27, which are interconnected by two continuous steel cables 31. The reciprocal spacing of the blocks 27 is obtained by providing soldering points 33 at the locations where the steel cables 31 pass out of the blocks.

According to FIG. 3c, the multilink chain 19 is formed by a plurality of directly adjacent solid chain links 35 and in each case two adjacent links 35 are pivotable about a common axis 37 which, in the fitted state, is parallel to the plug connection axis.

According to FIG. 3d, the multilink chain 19 comprises a plurality of interconnected, spaced steel rollers 39. Steel rollers 39, like the parallepipedic steel blocks according to FIG. 3b are kept spaced by soldering points 33 applied to a steel cable 31. A chain having this construction is to be fitted into an annulus with a circular cross-section formed between the male and female parts.

What is claimed is:

1. A plug connection for drilling or boring tubes, rods and worms of earth boring equipment or the like, said plug connection comprising
   a male part,
   a female part,
   a radial coupling and an axial coupling defined by said male part and said female part for interconnecting said male part and said female part and for transfer of torque between said male part and said female part, said axial coupling being arranged in an overlap zone defined by said male and female parts,
   a locking device for the positive coupling of said male part and said female part, said locking device being introduced from the outside through said female part and into superimposed recesses extending circumferentially as an annulus in both said male and female parts, said locking device is constructed as a multilink chain with interfitted links, said chain extending completely around said annulus and said chain being introduced through said female part into said annulus via a single opening.

2. A device according to claim 1, wherein the multilink chain is formed by a plurality of steel blocks.

3. A device according to claim 2, wherein the multilink chain can be prevented from automatically moving about by a securing means which can be introduced into the opening in the female part.

4. A device according to claim 1, wherein the multilink chain is formed by a plurality of immediately adjacent, solid chain links, two adjacent links being in each case pivotable about a common axis.

5. A device according to claim 1, wherein at the opening, at least one of the sides circumferentially defining said opening is chamfered in such a way that the multilink chain can be introduced substantially tangentially into the annulus.

6. A device according to claim 1, wherein spaced, axially extending pockets are formed on to the inner circumference of the front end portion of the female part which overlaps the male part and said pockets are complementary to wedges formed on the male part.

7. A device according to claim 1, wherein an annular slot, in to which can be placed a packing, is formed axially upstream of the recess on the outer circumference of the front end portion of the male part.

* * * * *